US009565210B2

(12) United States Patent
Hsiung et al.

(10) Patent No.: US 9,565,210 B2
(45) Date of Patent: Feb. 7, 2017

(54) APPLIANCE FOR PROCESSING A SESSION IN NETWORK COMMUNICATIONS

(75) Inventors: Wei-Hsiang Hsiung, Taipei (TW); Wei-Shiau Suen, Taipei (TW); Ya Hsuan Tsai, Taipei (TW); Rick M F Wu, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1007 days.

(21) Appl. No.: 13/591,592

(22) Filed: Aug. 22, 2012

(65) Prior Publication Data
US 2013/0054823 A1 Feb. 28, 2013

(30) Foreign Application Priority Data

Aug. 30, 2011 (TW) .............................. 100131055 A

(51) Int. Cl.
G06F 15/16 (2006.01)
H04L 29/06 (2006.01)
H04L 29/08 (2006.01)

(52) U.S. Cl.
CPC ....... *H04L 63/1466* (2013.01); *H04L 63/0281* (2013.01); *H04L 63/08* (2013.01); *H04L 67/146* (2013.01); *H04L 67/2871* (2013.01)

(58) Field of Classification Search
CPC ... H04L 67/2871; H04L 63/0281; H04L 63/08
USPC ................................................. 709/219, 228
See application file for complete search history.

(56) References Cited

U.S. PATENT DOCUMENTS

| 5,694,569 | A | 12/1997 | Fischer |
| 6,058,399 | A | 5/2000 | Morag et al. |
| 6,363,478 | B1 | 3/2002 | Lambert et al. |
| 6,393,438 | B1 | 5/2002 | Kathrow et al. |
| 6,449,613 | B1 | 9/2002 | Egolf et al. |
| 6,678,791 | B1 * | 1/2004 | Jacobs .............. G06F 17/30902 709/203 |

(Continued)

FOREIGN PATENT DOCUMENTS

| CN | 101253520 | 8/2008 |
| TW | 201027963 | 7/2010 |
| WO | 2008067113 A2 | 6/2008 |

OTHER PUBLICATIONS

Martin Johns, Bastian Braun, Michael Schrank, and Joachim Posegga; SAP Research and University of Passau, "Reliable Protection Against Session Fixation Attacks", abstract only, Proceeding SAC '11 Proceedings of the 2011 ACM Symposium on Applied Computing, New York, New York, 2011; http://dx.doi.org/10.1145/1982185.1982511.

(Continued)

*Primary Examiner* — Imad Hussain
(74) *Attorney, Agent, or Firm* — Thomas E. Lees, LLC

(57) ABSTRACT

A session of network communications is processed between a client terminal and a server by intercepting a request generated from a network transport unit of the client terminal, generating an intermediate session ID for the client terminal, asking the server to establish a session, receiving a response sent from the server using a server session ID after the session is established, associating the server session ID with the intermediate session ID and sending the response to the network transport unit using the intermediate session ID.

21 Claims, 8 Drawing Sheets

(56) References Cited

U.S. PATENT DOCUMENTS

| | | | |
|---|---|---|---|
| 7,043,455 B1 | 5/2006 | Cuomo et al. | |
| 7,359,933 B1* | 4/2008 | Polen | H04L 67/34 709/203 |
| 7,363,376 B2* | 4/2008 | Uhlik | H04W 76/021 455/414.3 |
| 7,467,353 B2 | 12/2008 | Kurlander et al. | |
| 7,487,353 B2 | 2/2009 | Pryor et al. | |
| 7,908,649 B1* | 3/2011 | Arora | G06F 17/30902 726/7 |
| 8,649,768 B1* | 2/2014 | Gaddam | H04W 12/06 455/411 |
| 2002/0101442 A1* | 8/2002 | Costanzo | H04L 29/06027 715/723 |
| 2002/0104022 A1 | 8/2002 | Jorgenson | |
| 2003/0028768 A1 | 2/2003 | Leon et al. | |
| 2003/0037108 A1* | 2/2003 | Peiffer | H04L 29/06 709/203 |
| 2004/0088349 A1* | 5/2004 | Beck | H04L 63/0407 709/203 |
| 2004/0117486 A1* | 6/2004 | Bourne | G06F 17/30902 709/228 |
| 2005/0188079 A1* | 8/2005 | Motsinger | H04L 63/1416 709/224 |
| 2006/0114832 A1* | 6/2006 | Hamilton | H04L 12/2602 370/244 |
| 2008/0126794 A1* | 5/2008 | Wang | H04L 63/0464 713/151 |
| 2008/0139203 A1* | 6/2008 | Ng | H04W 12/06 455/436 |
| 2008/0140847 A1 | 6/2008 | Almog | |
| 2008/0148366 A1* | 6/2008 | Wahl | G06F 21/36 726/4 |
| 2009/0055904 A1* | 2/2009 | Gomi | H04L 63/08 726/4 |
| 2009/0265467 A1* | 10/2009 | Peles | H04L 47/10 709/226 |
| 2009/0282239 A1* | 11/2009 | Doleh | G06F 21/335 713/155 |
| 2010/0106841 A1 | 4/2010 | Barnert | |
| 2011/0219431 A1* | 9/2011 | Akhtar | H04L 41/5054 726/4 |
| 2011/0296048 A1* | 12/2011 | Knox | H04L 65/605 709/231 |
| 2012/0166627 A1* | 6/2012 | Kraiman | H04L 43/12 709/224 |

OTHER PUBLICATIONS

Sambuddho Chakravarty, Georgios Portokalidis, Michalis Polychronakis and Angelos D. Keromytis; Columbia University, New York, USA, "Detecting Traffic Snooping in Tor Using Decoys"; 2011; http://www1.cs.columbia.edu/~angelos/Papers/2011/tor_decoys.pdf.

(Talo Dacosta, Saurabh Chakradeo, Mustaque Ahamad and Patrick Traynor; Converging Infrastructure Security (CISEC) Laboratory, Georgia Tech Information Security Center (GTISC) and Georgia Institute of Technology, "One-Time Cookies: Preventing Session Hijacking Attacks with Disposable Credentials", SCS Technical Report; GT-CS-11-04; 2011; http://hdl.handle.net/1853/37000.

Nick Nikiforakis, Wannes Meert, Yves Younan, Martin Johns and Wouter Joosen; IBBT-DistriNet, Katholieke Universiteit Leuven, Celestijnenlaan 200A B3001, Leuven, Belgium and SAP Research—CEC Karlsruhe, "SessionShield: Lightweight Protection against Session Hijacking", 2011; https://lirias.kuleuven.be/bitstream/123456789/297677/1/sshield.pdf.

B. Sujatha, Raghunadh Pasunuri and R. Manjula; Ramappa Engineering College, Warangal, India and University of Hyderabad, Hyderabad, India, "Prevention of Session Data Dependent Vulnerabilities Using GUID (Globally Unique Identifier) and Integrity Stamp", IT and Business Intelligence, 2010; http://imtcj.ac.in/ITBI%2010%20Proceedings/Book/104.pdf.

David Endler, "Brute-Force Exploitation of Web Application Session IDs", iDEFENSE Inc., Chantilly, VA; Nov. 1, 2001.

Tom Merritt, "How to: Add a camera to the iPad"; CBS Interactive; CNET TV, Video Playlist, Apr. 8, 2010; http://cnettv.cnet.com/add-camera-ipad/9742-1_53-50086026.html.

Scott Gilbertson, "HTTPS is More Secure, So Why Isn't the Web Using It?", Webmonkey, Wired.com, Mar. 18, 2011; Webmonkey; http://www.webmonkey.com/2011/03/https-is-more-secure-why-isnt-the-web-using-it-today/.

Steven Andres; "How to Stay Safe on Public Wi-Fi", PC World, IDG Consumer & SMB; Apr. 12, 2012; http://www.pcworld.com/printable/article/id,194062/printable.html.

I. Duda, M. Aleksy and T. Butter; Mannheim University, Germany; "Architectures for Mobile Device Integration into Service-Oriented Architectures", Mobile Business, 2005, ICMB 2005, International Conference on Mobile Business; Jul. 11-13, 2005, Mannheim University Germany; http://ieeexplore.ieee.org/xpl/freeabs_all.jsp?reload=true&arnumber=1493608.

Owasp: "The Open Web Application Security Project", downloaded on Jun. 14, 2012 at https://www.owasp.org/index.php/Session_hijacking_attack.

* cited by examiner

| No | IP | MAC | server web domain | session name | server session ID | intermediate session ID | expiration date |
|---|---|---|---|---|---|---|---|
| 1 | 9.191.80.15 | 70:F3:95:06:2 2:9D | ibm.com | SID | 48549459286 | 9069877234l | 2011/08/22 17:35:19 |
| 2 | 9.191.80.15 | 70:F3:95:06:2 2:9D | google.com | SSID | xdEfaGDFSxq SfeGADSG5S sgfrt | orRgxcghpjkA ZryMhfsQsvF eagm | 2011/09/05 22:56:48 |
| 3 | 9.191.80.37 | 70:F3:95:A2:9 8:03 | facebook.com | ID | xghjipSArhAry rASDFhVvXQ erGFSGdaert | xcvhRYQWvb FDSWszKLfg nfrryJqd | 2011/08/13 05:33:01 |
| ... | | | | | ... | | |

FIG.8

APPLIANCE FOR PROCESSING A SESSION IN NETWORK COMMUNICATIONS

CROSS-REFERENCE TO RELATED APPLICATIONS

This application is based on and claims priority to Taiwan Patent Application 100131055, filed on Aug. 30, 2011.

BACKGROUND

The present invention relates to a method and appliance for processing a session in network communications.

To ensure the security of network communications, it is necessary to prevent session hijacking In general, session hijacking comprises session sniffing and cross-site script attack (XSS). To cope with session hijacking, plenty of conventional methods are put forth, such as in U.S. Pat. Nos. 6,363,478, 7,043,455, and 7,487,353, which are owned by the applicant of the present invention.

BRIEF SUMMARY

According to aspects of the present invention, a session of network communications is processed between a client terminal and a server. The session is processed by receiving a request generated from a network transport unit of the client, generating an intermediate session ID for the client terminal and requesting the server to establish a session. The session is further processed by receiving a response sent from the server using a server session ID after the session is established, associating the server session ID with the intermediate session ID and sending the response to the network transport unit using the intermediate session ID.

BRIEF DESCRIPTION OF THE SEVERAL VIEWS OF THE DRAWINGS

In order that the advantages of aspects of the invention will be readily understood, a more particular description of the aspects briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

FIG. 8 is a session table according to a specific embodiment of the present invention.

DETAILED DESCRIPTION

Figure 1:
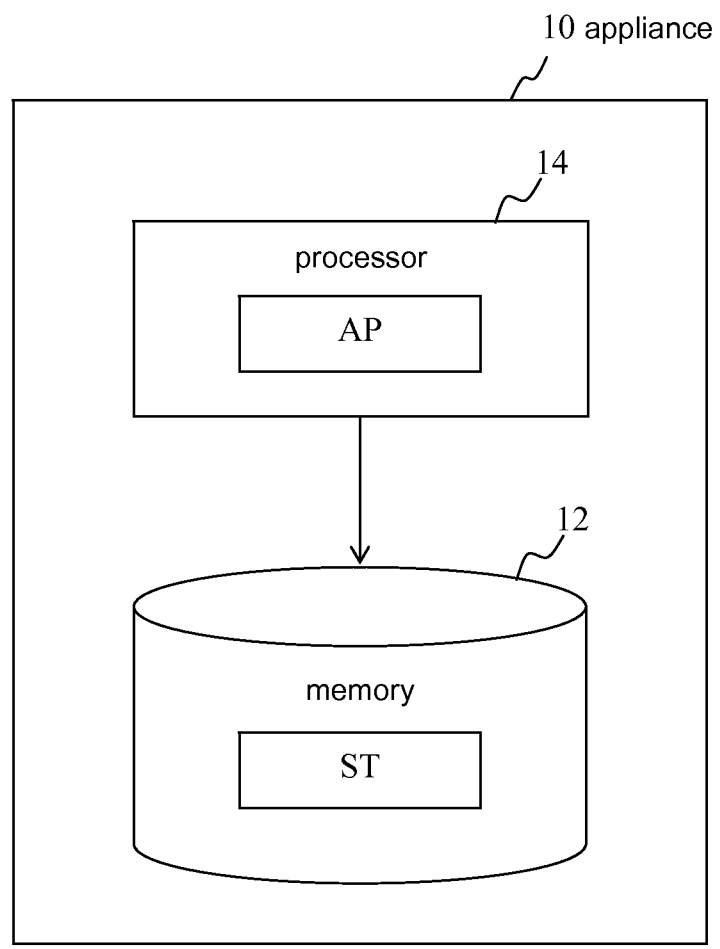
FIG. 1 is a schematic view of an appliance according to a specific embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as an information appliance, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1 through FIG. 7, terminal devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One aspect of the present invention provides a true/false replacement mechanism for a session ID on the path of network communications between a client terminal and a server.

Unlike the server end, the client terminal is usually located at an environment of a low degree of security (such as a public space where a wireless connection (such as Wi-Fi connection) is available). Hence, it is advisable to approach the client terminal with a false session ID for the sake of communication, replace the false session ID with a true session ID just before entering an environment of a high degree of security (such as a backbone network), and communicate with the server using the true session ID. Accordingly, even if the false session ID is at the risk of being sniffed or stolen, user security will largely remain unaffected, because the server end does not accept the false session ID. For example, although the aforesaid method is applicable to prevention of session sniffing, its application is not limited thereto.

Another aspect of the present invention provides a true/false replacement mechanism of a session ID inside the client terminal.

Most protocols, such as HTTP, require that a session ID be stored at a specific location (such as HTTP cookie) in the client terminal. As a result, the session ID is at the risk of being detected readily and stolen. That is to say, the specific location is unsafe. Therefore, it is feasible for a false session ID to be stored in a specific location and function as a substitute. Eventually the false session ID is replaced with a true session ID just before communication with the server begins. Similarly, even if the false session ID is at risk of being stolen, user security will largely remain unaffected. For example, the aforesaid method is applicable to prevention of cross-site script attack (XSS), but its application is not limited thereto.

An aspect of the present invention provides, in an embodiment, a method for processing a session of network communications between a client terminal and a server, the client terminal having a network transport unit (such as a browser). The method comprises intercepting a request generated from the network transport unit, generating an intermediate session ID for the client terminal and asking the server to establish a session. The method further comprises receiving a response sent from the server using a server session ID after the session is established, associating the server session ID with the intermediate session ID and sending the response to the network transport unit using the intermediate session ID.

Another embodiment of the invention provides a method for processing a session of network communications between a client terminal and a server, the client terminal having a network transport unit (such as a browser). The method comprises receiving a response sent from the server using a server session ID after the server establishes the session for the client terminal, replacing the server session ID with an intermediate session ID and sending the response to the network transport unit using the intermediate session ID.

In other embodiments, an appliance and a computer-readable medium or a computer program product which are applicable to the aforesaid methods are further provided.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that aspects of the invention may be practiced without one or more of the specific features or advantages of a particular embodiment. In other instances, additional features and advantages may be recognized in certain embodiments that may not be present in all embodiments of the invention.

FIG. 1 is a block diagram of an appliance 10 according to an embodiment of the present invention. The appliance 10 includes, but is not limited to, an access point, a set top box, a router, a switch, a gateway, a firewall device, a proxy server, or an intrusion prevention system (IPS) device.

In particular, the appliance 10 comprises a memory 12 and a processor 14. The memory 12 is a portable computer diskette, a hard disk drive, a random access memory (RAM), a read-only memory (ROM), an erasable programmable read-only memory (EPROM or Flash memory), a portable compact disc read-only memory (CD-ROM), an optical storage device, or a magnetic storage device. The memory 12 stores a program code. The processor 14 accesses the program code of the memory 12, so as to execute the program AP.

Figure 2:
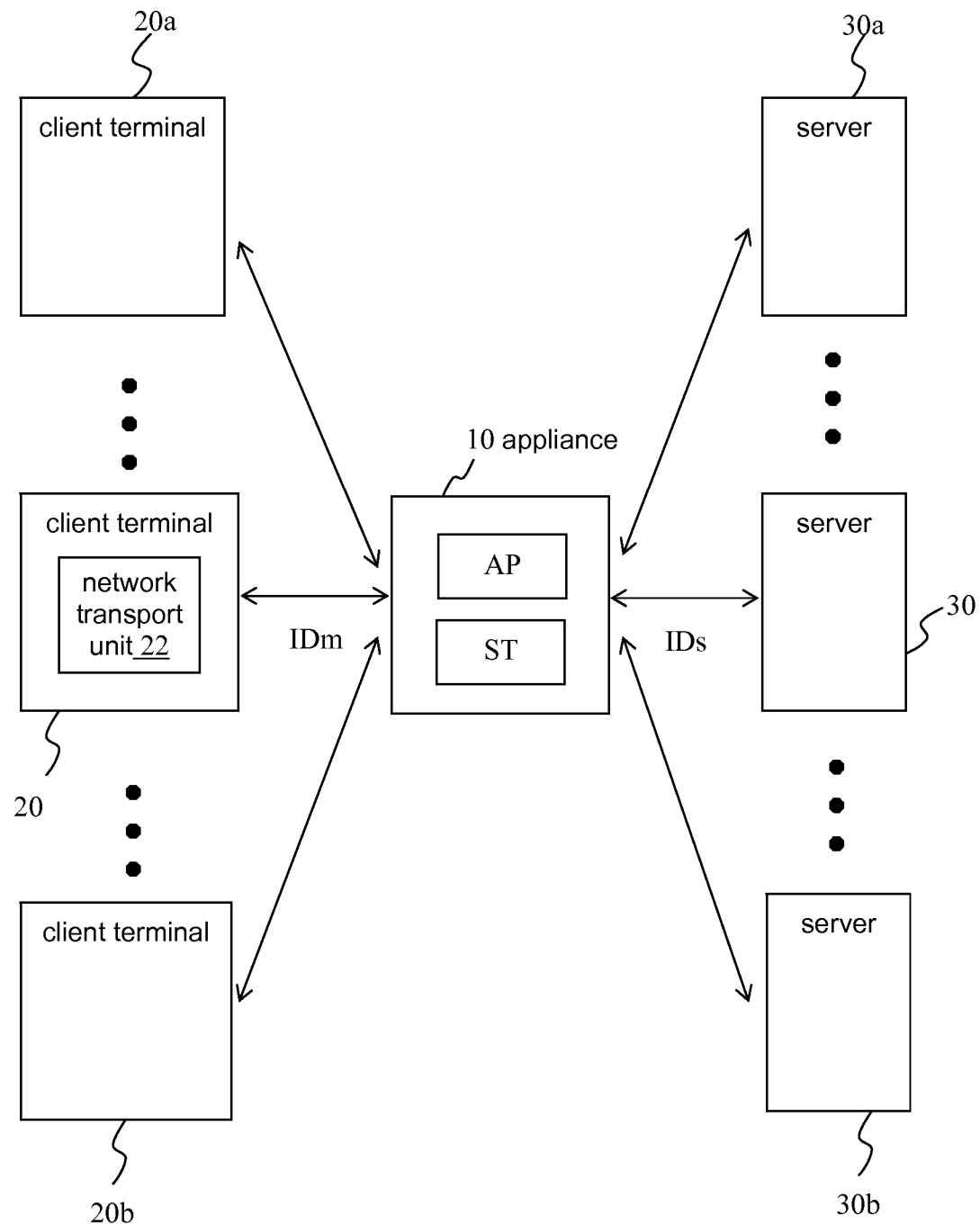
FIG. 2 and FIG. 5 are block diagrams of a system according to a specific embodiment of the present invention.

In particular, the program AP generates an intermediate session ID (IDm) and performs a replacement between the intermediate session ID (IDm) and a server session ID (IDs) provided by a server 30 (see FIG. 2). Preferably, the program AP further produces a session table ST to be stored in the memory 12 (or another memory in the appliance 10) for recording the correlation between the intermediate session ID (IDm) and the server session ID (IDs). More details are given later.

Referring to FIG. 2, the appliance 10 is disposed and connected between a client terminal 20 and the server 30. The appliance 10 and the client terminal 20 can be connected by various networks (such as LAN, WAN, or Internet). Correspondingly, the appliance 10 and the server 30 can be connected by various networks (such as LAN, WAN, or Internet). In an embodiment, the appliance 10 and the client terminal 20 are connected by a wireless local area network (WLAN), whereas the appliance 10 and the server 30 are connected by the Internet, but the present invention is not limited thereto. Referring to FIG. 2, the appliance 10 supports a plurality of client terminals (20, 20a, 20b) and enables any client terminal to be connected to a plurality of servers (30, 30a, 30b).

The server 30 provides network services, such as social networking services, webpage/email services, mobile commerce services, or content and information provider services. In particular, the server 30 has to store users' personal data in order to provide the network services. Hence, to ensure security and privacy, the server 30 usually requires that, before accessing the services provided by the server 30, users have to undergo identity recognition (known as "login") with a username and a password, in order to prevent the users' personal data from being stolen or fraudulently changed.

The client terminal 20 is a personal mobile device or a personal computer, and comprises a network transport unit 22 (such as a browser). Data communication between the client terminal 20 and the server 30 takes place so as for the user to access a service provided by the server 30. More details are given later.

Establish New Session

Figure 3:
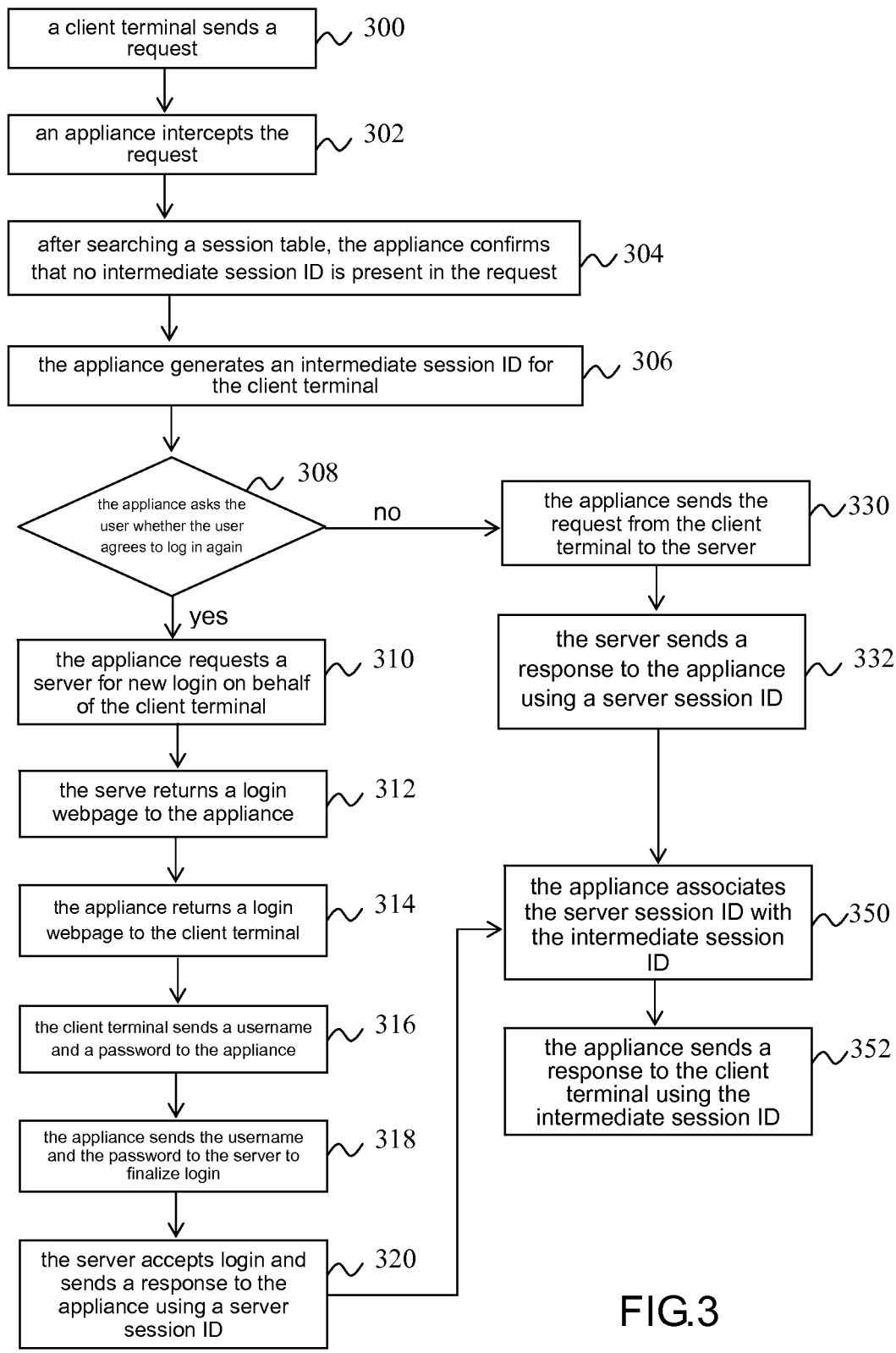
FIGS. 3, 4, 6, 7 are flow charts of a method according to a specific embodiment of the present invention.

FIG. 3 is a flow chart of a method of establishing a session according to an embodiment of the present invention. Referring to FIG. 1, FIG. 2, and FIG. 3, in an exemplary embodiment, the client terminal 20 is located at a coffee shop (not shown) that provides a public WLAN, whereas the appliance 10 functions as an access point that provides a wireless network. Within a given period of time, it is the first time the network transport unit 22 of the client terminal 20 gets connected to the server 30 via the appliance 10 in the coffee shop.

In this embodiment, before the process flow of the method illustrated with FIG. 3 begins, the client terminal 20 established a session together with the server 30 at another place (such as at home) and logged in a service provided by the server 30; hence, the network transport unit 22 has already acquired a session ID (hereinafter referred to as "preceding session ID") provided by the server 30 for the preceding session.

Step 300: the network transport unit 22 sends a request, wherein the request comprises the address (such as URL) of the server 30. Since it is the first time the network transport unit 22 gets connected to the server 30 at the coffee shop, the network transport unit 22 can send a request using the preceding session ID. In general, the data format of the request is formulated in accordance with a governing protocol (such as HTTP) and is omitted from the description below for the sake of brevity.

Step 302: as shown in FIG. 2, the client terminal 20 gets connected to the Internet and the server 30 via the appliance 10 (functioning as an access point). Therefore, all network packets sent from the client terminal 20 have to pass through the appliance 10 before reaching the Internet or the server 30, such that the appliance 10 receives a request sent from the network transport unit 22 in step 300.

Step 304: the processor 14 of the appliance 10 executes a program AP, and executes a session table ST stored in the memory 12 for enquiry by the program AP, so as to confirm that the preceding session ID used by the network transport unit 22 in step 300 is not the intermediate session ID (IDm) generated by the program AP, that is, determining that it is the first time the network transport unit 22 gets connected to the server 30 via the appliance 10.

Step 306: the program AP generates an intermediate session ID IDm for the client terminal 20 in response to the request sent from the network transport unit 22 in step 300. In particular, the program AP associates an ID (such as IP address or MAC) of the client terminal 20 with the intermediate session ID IDm generated from the ID, such that the program AP provides the intermediate session ID IDm generated therefrom to the client terminal 20 exclusively, especially in the situation where the program AP also has to support other client terminals 20a, 20b. The sending of the generated intermediate session ID IDm to the client terminal 20 does not necessarily occur in this stage, because it can occur in a later step.

Step 308: the program AP returns an alert webpage to the network transport unit 22 using the intermediate session ID IDm generated in step 306. The alert webpage gives the user a prompt about network security risks in the ambience (i.e., the public wireless network of the coffee shop) and asks the user whether the user agrees to log in again to the service provided by the server 30 (that is, entering the username and the password again for identity recognition carried out by the server 30). If the user agrees, the process flow of the method will go to step 310.

Step 310: the program AP sends another request on behalf of the network transport unit 22, so as to request the server 30 for permission to log in again the network services provided by the server 30.

Step 312: the server 30 returns a login webpage to the program AP in response to the request sent from the program AP. The login webpage comprises a username field and a password field. For further details, please refer to conventional login webpages for network services. The related details are omitted from the description herein for the sake of brevity.

Step 314: the program AP of the appliance 10 returns the login webpage fetched from the server 30 to the network transport unit 22.

Step 316: the user enters into the login webpage the username and password required for login, and then the network transport unit 22 sends the entered username and password to the program AP of the appliance 10.

Step 318: the program AP of the appliance 10 sends the username and password required for login to the server 30, so as to access the network services provided by the server 30.

Step 320: the server 30 performs verification using the username and password provided by the program AP. In case of a verification pass, the server 30 will generate a server session ID IDs, establish a new session, and send a session response to the appliance 10 using the server session ID IDs. In general, the data format of the response is formulated in accordance with a governing protocol (such as HTTP) and is omitted from the description below for the sake of brevity. At this point in time, the process flow of the method goes to step 350.

Step 350 involves associating the server session ID IDs with the intermediate session ID IDm and the ID of the client terminal 20 after the program AP of the appliance 10 has received the response sent from the server 30 using the server session ID IDs, and then recording the associating data in the session table ST of the memory 12. The session table ST further comprises other session-related data, such as the web domain of the server 30, a session recognition name, and the expiration date, as shown in FIG. 8.

Step 352: the program AP of the appliance 10 returns the response received from the server 30 to the network transport unit 22 of the client terminal 20 using the intermediate session ID IDm (i.e., the intermediate session ID IDm generated in step 306) associated with the server session ID IDs, such that the network transport unit 22 can present the response to the user and store the intermediate session ID IDm (in cookies, for example) for recognizing the session later.

A point to note is that, in step 316 through step 320, data being transmitted could be encrypted throughout the transmission process and governed by HTTPS, for example, to ensure data security.

If, in step 308, the user is reluctant to log in the server 30 again, the process flow of the method will go to step 330.

Step 330: the program AP sends to the server 30 the request previously sent from the client terminal 20 in step 300. The program AP sends the request using the preceding session ID used by the client terminal 20 in step 300.

Step 332: the server 30 sends a response to the appliance 10 using a server session ID IDs in response to the request from the program AP. The server 30 keeps treating the preceding session ID as a server session ID IDs; alternatively, the server 30 discards the preceding session ID (for example, when the preceding session ID has expired and lost validity), such that a new session ID can be generated to become a server session ID IDs (that is, establishing a new session). The method then proceeds to steps 350, 352, as set out in the above-description.

Replacement of Session ID

Figure 4:
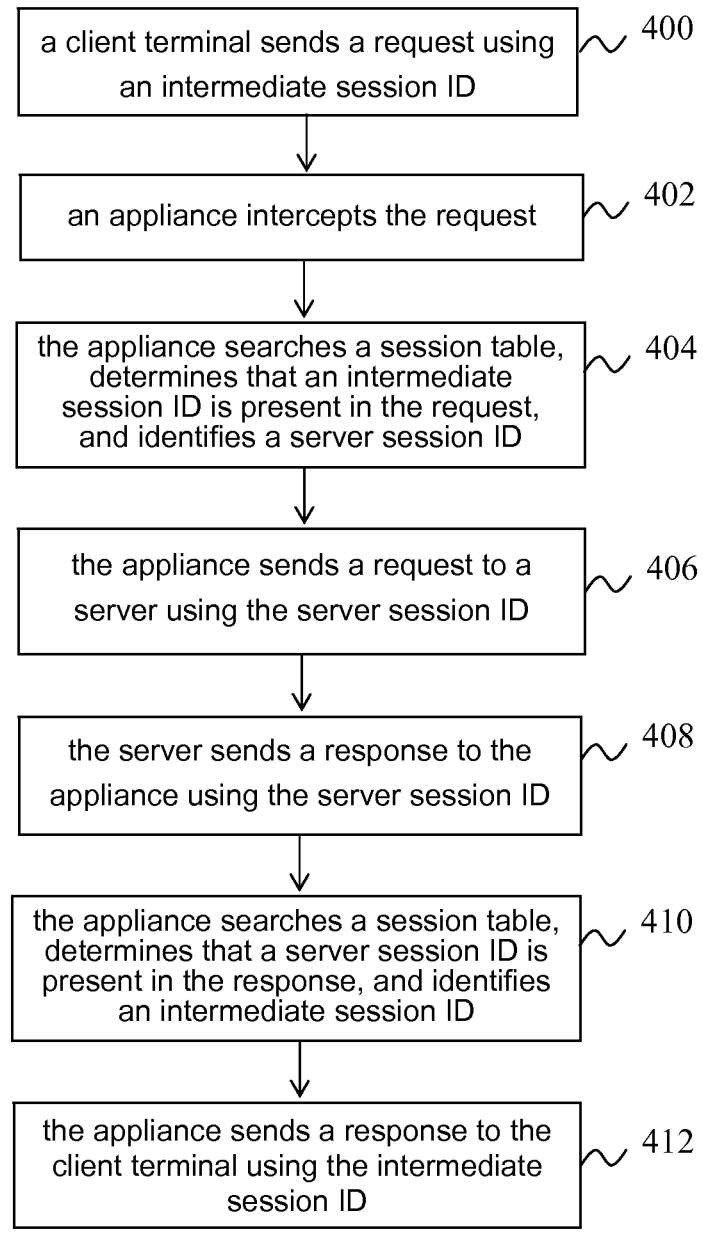

FIG. 4 is a flow chart of a method for use in session ID replacement according to an embodiment of the present invention. Before the process flow of the method illustrated with FIG. 4 starts, the network transport unit 22 has acquired an intermediate session ID IDm (see step 352 of FIG. 3), whereas an intermediate session ID IDm, the ID of the client terminal 20, and the correlation of the server session ID IDs (see FIG. 3, step 306 and step 350) have been present in the session table ST of the memory 12 of the appliance 10.

Step 400: the network transport unit 22 sends a request using an intermediate session ID IDm.

Step 402: the appliance 10 receives a request sent from the network transport unit 22 in step 400.

Step 404: the processor 14 of the appliance 10 executes the program AP, and the program AP searches the session table ST stored in the memory 12 so as to confirm that the intermediate session ID IDm used by the network transport unit 22 in step 400 is the intermediate session ID IDm generated from the program AP previously (see step 306 of FIG. 3). The processor further identifies the server session ID IDs associated with the intermediate session ID IDm according to the session table ST. Preferably, the program AP further determines whether the ID of the client terminal 20 matches the ID (such as IP/MAC) of the client terminal corresponding to the intermediate session ID IDm in the session table ST.

Step 406: the program AP sends to the server 30 a request sent from the network transport unit 22 in step 400. The program AP sends the request using the server session ID IDs identified in step 404. That is, the program AP performs session ID replacement, which entails replacing the intermediate session ID IDm initially used by the network transport unit 22 with a server session ID IDs.

Step 408: the server 30 sends a response to the appliance 10 using a server session ID IDs in response to a request from the program AP.

Step 410: after the program AP of the appliance 10 has received a response sent from the server 30, the program AP searches, using a server session ID IDs, the session table ST stored in the memory 12 and identifies the intermediate session ID IDm corresponding to the server session ID IDs.

Step 412: the program AP returns to the network transport unit 22 a response received from the server 30 using the intermediate session ID IDm identified in step 410, such that the network transport unit 22 can present the response to the user. In this regard, the program AP performs session ID replacement once again, that is, replacing the server session ID IDs used by the server 30 with the intermediate session ID IDm.

In the method illustrated with FIG. 4, even if the server 30 and the network transport unit 22 use different session IDs (that is, the server 30 uses a server session ID IDs, whereas the network transport unit 22 uses an intermediate session ID IDm), the server 30 and the network transport unit 22 can confirm whether the communication therebetween takes place in the same session, as long as the server session ID IDs and the intermediate session ID IDm remain unchanged. In doing so, not only is the basic purpose of session IDs achieved, but network security is maintained.

Variant Embodiment

Figure 5:
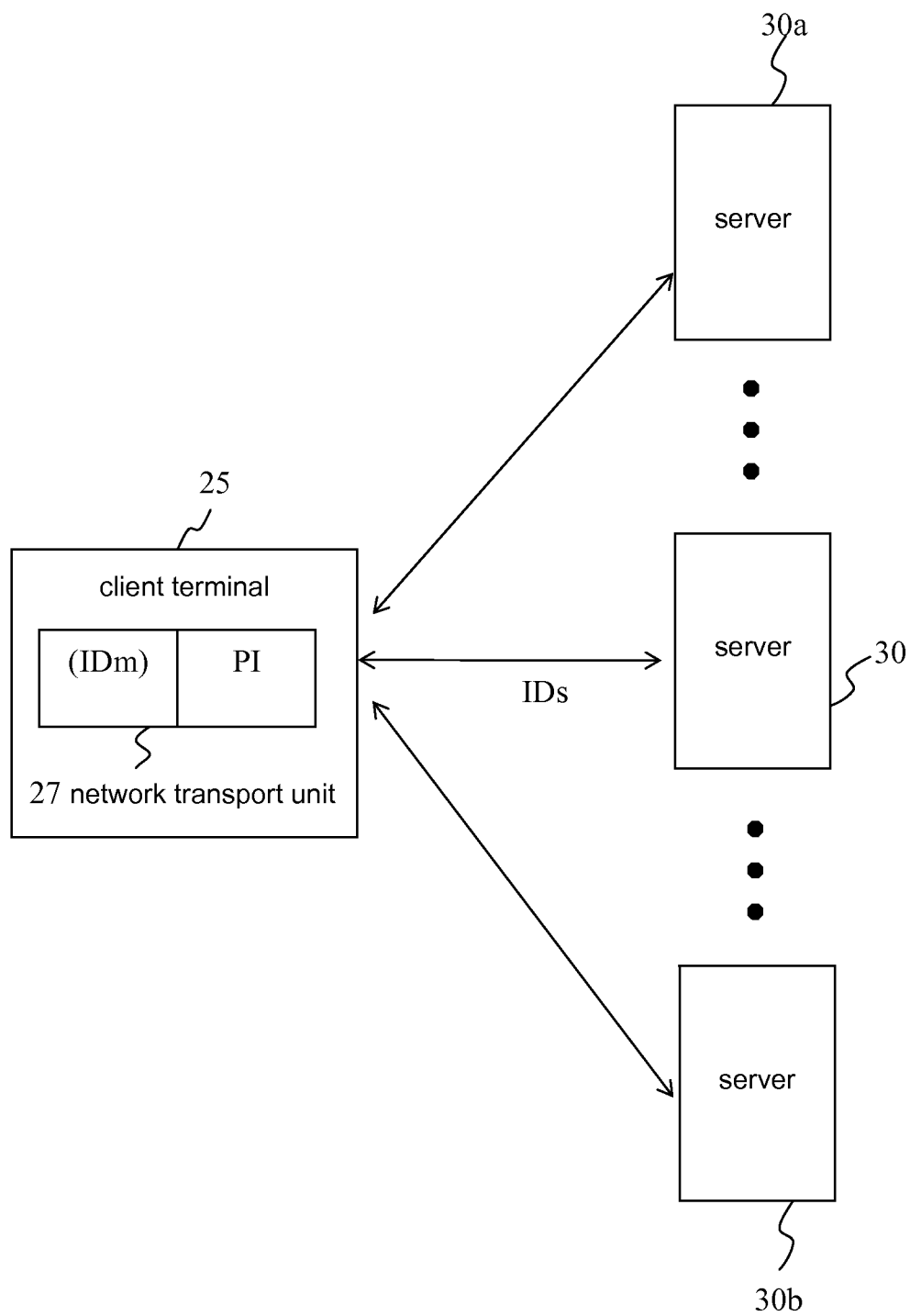

Referring to FIG. 5, a client terminal 25 is a personal mobile device or a personal computer, and has a network transport unit 27 (such as a browser) connected to the server 30 (or the server 30a, 30b) by various networks (such as LAN, WAN, or Internet). There is data communication between the client terminal 25 and the server 30 allowing the user to access the services provided by the server 30. Unlike the system of FIG. 2, the system of FIG. 4 dispenses with the appliance 10. Conversely, as shown in FIG. 4, the network transport unit 27 of the client terminal 25 has a plug-in PI. For the embodiment of the plug-in PI, please refer to the plug-in of Firefox™ browser of "buySAFE Shopping Advisor" or the plug-in of Chrome™ browser of "HTTP Headers".

In particular, unlike the program AP of the appliance 10 of FIG. 1, the plug-in PI inside the client terminal 25 of FIG. 5 generates the intermediate session ID IDm and performs the replacement between the intermediate session ID IDm and the server session ID IDs provided by the server 30. Preferably, the plug-in PI further produces the session table ST and stores it in a memory (not shown, but preferably distinguished from the memory address in which the session ID is stored by the network transport unit 27) of the client terminal 25 for recording the correlation between the intermediate session ID IDm and the server session ID IDs. More details are given later.

Figure 6:
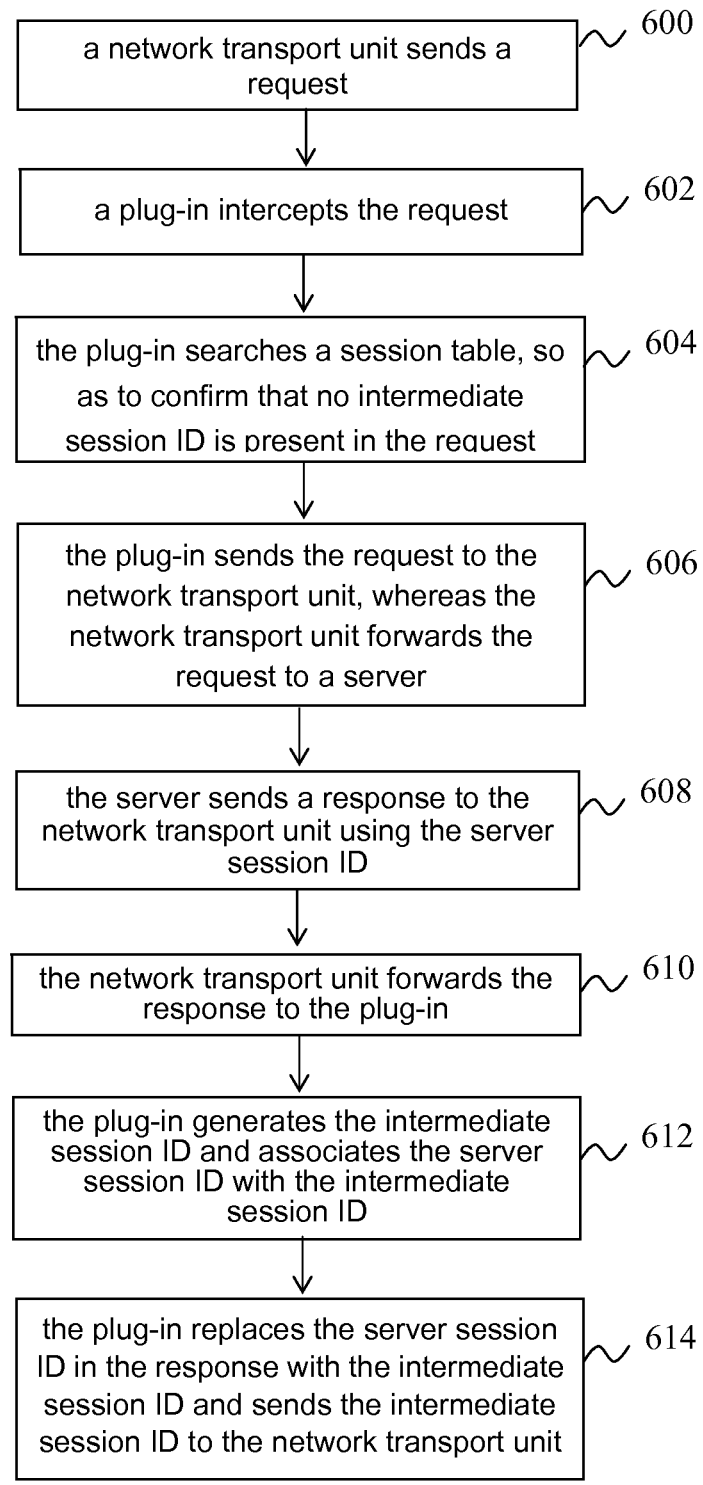

FIG. 6 is a flow chart of the method according to a variant embodiment of the present invention. Referring to FIG. 5 and FIG. 6, in this variant embodiment, it is the first time the network transport unit 27 of the client terminal 25 gets connected to a server.

Step 600: the network transport unit 27 sends a request, wherein the request comprises the address (such as URL) of the server 30. Since it is the first time the network transport unit 27 gets connected to the server 30, there is no session ID available for the network transport unit 27.

Step 602: as shown in FIG. 5, the network transport unit 27 has the plug-in PI, and thus the plug-in PI receives the request sent from the network transport unit 27 in step 600.

Step 604: the plug-in PI searches the session table ST, so as to confirm that in step 600 the network transport unit 27 does not use the intermediate session ID (IDm) generated from the plug-in PI, that is, determining that it is the first time the network transport unit 27 gets connected to the server 30.

Step 606: the plug-in PI sends the request to the network transport unit 27, whereas the network transport unit 27 forwards the request to the server 30.

Step 608: the server 30 generates a server session ID IDs (i.e., establishing a new session) in response to the request from the network transport unit 27, and sends a response to the network transport unit 27 using the server session ID IDs.

Step 610: the network transport unit 27 forwards to the plug-in PI the response sent from the server 30 using the server session ID IDs.

Step 612: the plug-in PI generates the intermediate session ID IDm in response to the response sent from the server 30, associates the server session ID IDs with the intermediate session ID IDm, and records them in the session table ST.

Step 614: the plug-in PI replaces the server session ID IDs in the response sent from the server 30 with the intermediate session ID IDm generated in step 612 and sends the intermediate session ID IDm to the network transport unit 27, such that the network transport unit 27 presents the response to the user and stores the intermediate session ID IDm (in HTTP cookies, for example) for recognizing the session later.

Figure 7:
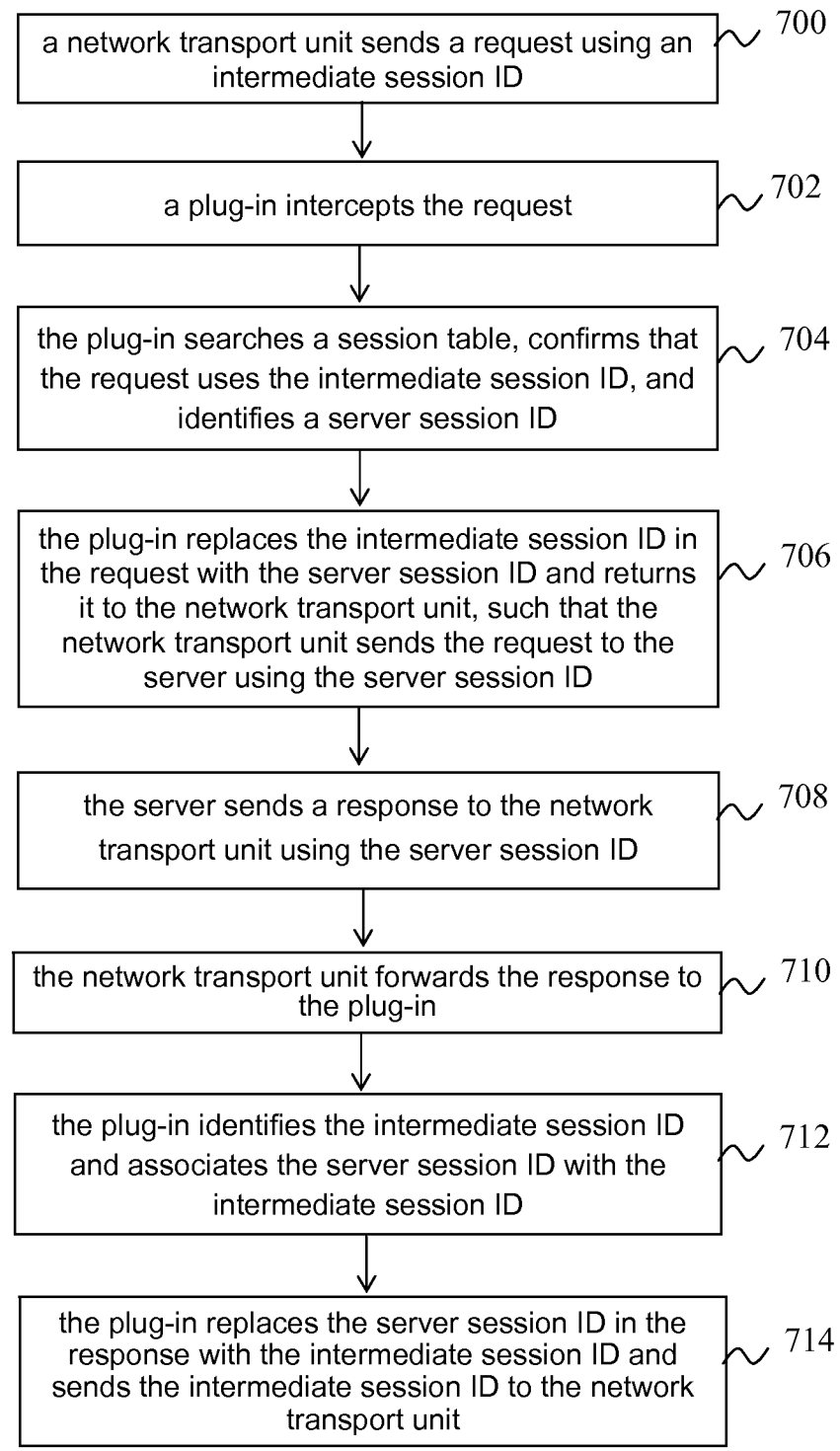

FIG. 7 is a flow chart of the method of session ID replacement according to an embodiment of the present invention. Before the process flow of the method illustrated with FIG. 6 begins, the network transport unit 27 has acquired an intermediate session ID IDm (see step 614 of FIG. 6), and the correlations between the intermediate session ID IDm and the server session ID IDs have been present in the session table ST of the plug-in PI (see step 612 of FIG. 6).

Step 700: the network transport unit 27 sends a request using an intermediate session ID IDm.

Step 702: the plug-in PI receives the request sent from the network transport unit 27 in step 700.

Step 704: the plug-in PI searches the session table ST, so as to confirm that in step 700 the network transport unit 27 uses the intermediate session ID IDm generated from the plug-in PI, and identifies a server session ID IDs associated with the intermediate session ID IDm (see steps 612, 614 of FIG. 6).

Step 706: the plug-in PI replaces the intermediate session ID IDm in the request sent from the network transport unit 27 with the server session ID IDs identified in step 704 and returns it to the network transport unit 27, such that the network transport unit 27 sends the request to the server 30 using the server session ID IDs.

Step 708: the server 30 sends a response to the network transport unit 27 using the server session ID IDs in response to the request from the network transport unit 27.

Step 710: the network transport unit 27 forwards to the plug-in PI the response sent from the server 30 using the server session ID IDs.

Step 712: the plug-in PI searches and stores the session table ST and identifies the intermediate session ID IDm associated with the server session ID IDs (see steps 612, 614 of FIG. 6).

Step 714: the plug-in PI replaces the server session ID IDs in the response sent from the server 30 with the intermediate session ID IDm generated in step 612 and sends the intermediate session ID IDm to the network transport unit 27, such that the network transport unit 27 can present the response to the user.

A point to note is that, in the steps illustrated with FIG. 6 and FIG. 7, data being transmitted could be encrypted throughout the transmission process and governed by HTTPS, for example, to ensure data security.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A method for processing a session of network communications between a client terminal and a server, the client terminal having a network transport unit, the method comprising:
receiving a request generated from the network transport unit of the client terminal, wherein the request includes a preceding session ID;
determining whether the preceding session ID is in a mapping table that maps intermediate session IDs to server session IDs;
generating an intermediate session ID for the client terminal if the preceding session ID is not found in the mapping table;
sending an alert to the client using the intermediate session ID, wherein the alert includes a prompt to whether the client agrees to log in again to the server;
receiving a response from the client that indicates whether or not the client agrees to log in again to the server;
performing if the client agrees to log in again:
receiving a username and a password from the client
sending the username and the password to the server; and receiving a new server session ID from the server as a server session ID;
performing if the client does not agree to login again:
sending the request to the server using the preceding session ID; and
receiving a server session ID from the server;
storing the intermediate session ID as a cookie for recognizing the session later;
associating the server session ID with the intermediate session ID; and
sending the response to the network transport unit using the intermediate session ID.

2. The method of claim 1, wherein generating the intermediate session ID for the client terminal further comprises:
associating an ID of the client terminal with the intermediate session ID.

3. The method of claim 1, wherein performing if the client agrees to log in again further comprises:
fetching a login webpage from the server; and
returning the login webpage to the client for prompting a user of the client terminal to provide the username and the password.

4. The method of claim 1, wherein, after sending the response to the network transport unit, the method further comprising:
intercepting the network transport unit with a request sent from the intermediate session ID;
replacing the intermediate session ID with the server session ID; and
sending the request to the server using the server session ID.

5. Computer-readable hardware with an executable program stored thereon, wherein the program instructs a microprocessor to process a session of network communications between a client terminal and a server, the client terminal having a network transport unit, the executable program comprising code for:
receiving a request generated from the network transport unit of the client terminal, wherein the request includes a preceding session ID;
determining whether the preceding session ID is in a mapping table that maps intermediate session IDs to server session IDs;
generating an intermediate session ID for the client terminal if the preceding session ID is not found in the mapping table;
sending an alert to the client using the intermediate session ID, wherein the alert includes a prompt to whether the client agrees to log in again to the server;
receiving a response from the client that indicates whether or not the client agrees to log in again to the server;
performing if the client agrees to log in again:
receiving a username and a password from the client;
sending the username and the password to the server; and
receiving a new server session ID from the server as a server session ID;
performing if the client does not agree to login again:
sending the request to the server using the preceding session ID; and
receiving a server session ID from the server;
storing the intermediate session ID as a cookie for recognizing the session later;
associating the server session ID with the intermediate session ID; and
sending the response to the network transport unit using the intermediate session ID.

6. The computer-readable hardware of claim 5, wherein the code for generating the intermediate session ID for the client terminal further comprises:
code for associating an ID of the client terminal with the intermediate session ID.

7. The computer-readable hardware of claim 5, wherein the code for performing if the client agrees to log in again further comprises code for:
fetching a login webpage from the server; and
returning the login webpage to the client for prompting a user of the client terminal to provide the username and the password.

8. The computer-readable hardware of claim 5, further comprising code executed after sending the response to the network transport unit, the executed code comprising:
code for intercepting the network transport unit with a request sent from the intermediate session ID;
code for replacing the intermediate session ID with the server session ID; and
code for sending the request to the server using the server session ID.

9. A system comprising:
a processor coupled to memory, wherein when the processor executes the instructions in the memory for processing a session of network communications between a client terminal and a server, by:
receiving a request generated from the network transport unit of the client terminal, wherein the request includes a preceding session ID;
determining whether the preceding session ID is in a mapping table that maps intermediate session IDs to server session IDs;
generating an intermediate session ID for the client terminal if the preceding session ID is not found in the mapping table;
sending an alert to the client using the intermediate session ID, wherein the alert includes a prompt to whether the client agrees to log in again to the server;
receiving a response from the client that indicates whether or not the client agrees to log in again to the server;
performing if the client agrees to log in again:
receiving a username and a password from the client;
sending the username and the password to the server; and
receiving a new server session ID from the server as a server session ID;
performing if the client does not agree to login again:
sending the request to the server using the preceding session ID; and
receiving a server session ID from the server;
storing the intermediate session ID as a cookie for recognizing the session later;
associating the server session ID with the intermediate session ID; and
sending the response to the network transport unit using the intermediate session ID.

10. The system of claim 9, wherein the processor generates the intermediate session ID for the client terminal further comprising:
associating an ID of the client terminal with the intermediate session ID.

11. The system of claim 9, instructions for performing if the client agrees to log in again further comprise instructions for:
fetching a login webpage from the server; and returning the login webpage to the client for prompting a user of the client terminal to provide the username and the password.

12. The system of claim 9, wherein after sending the response to the network transport unit, further comprising:
    intercepting the network transport unit with a request sent from the intermediate session ID;
    replacing the intermediate session ID with the server session ID; and
    sending the request to the server using the server session ID.

13. The method of claim 1, wherein generating an intermediate session ID for the client terminal further comprises generating an intermediate session ID for the client terminal after receiving the response sent from the server.

14. The computer-readable memory of claim 5, wherein code for generating an intermediate session ID for the client terminal further comprises code for generating an intermediate session ID for the client terminal after receiving the response sent from the server.

15. The system of claim 9, wherein generating an intermediate session ID for the client terminal further comprises generating an intermediate session ID for the client terminal after receiving the response sent from the server.

16. The method of claim 1, wherein receiving a server session ID from the server if the client does not agree to login again further comprises receiving a new server session ID from the server as the server session ID.

17. The method of claim 1, wherein receiving a server session ID from the server if the client does not agree to login again further comprises receiving a preceding server session ID from the server as the server session ID.

18. The computer-readable memory of claim 5, wherein the code for receiving a server session ID from the server if the client does not agree to login again further comprises code for receiving a new server session ID from the server as the server session ID.

19. The computer-readable memory of claim 5, wherein the code for receiving a server session ID from the server if the client does not agree to login again further comprises code for receiving a preceding server session ID from the server as the server session ID.

20. The system of claim 9, wherein receiving a server session ID from the server if the client does not agree to login again further comprises receiving a new server session ID from the server as the server session ID.

21. The system of claim 9, wherein receiving a server session ID from the server if the client does not agree to login again further comprises receiving a preceding server session ID from the server as the server session ID.

* * * * *